United States Patent
Wang (10) Patent No.: US 9,192,018 B2
(45) Date of Patent: Nov. 17, 2015

(54) ELECTROLUMINESCENCE DEVICE, A PRODUCTION PROCESS OF THE SAME AND A DISPLAY APPARATUS

(71) Applicants: BOE Technology Group Co., Ltd., Beijing (CN); Hefei Xinsheng Optoelectronics Technology Co., Ltd., Anhui (CN)

(72) Inventor: Shaozhuan Wang, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 0 days.

(21) Appl. No.: 14/447,945

(22) Filed: Jul. 31, 2014

(65) Prior Publication Data

US 2015/0257234 A1    Sep. 10, 2015

(30) Foreign Application Priority Data

Mar. 6, 2014  (CN) .......................... 2014 1 0081046

(51) Int. Cl.
| | |
|---|---|
| *H01L 33/48* | (2010.01) |
| *H05B 33/14* | (2006.01) |
| *H05B 33/22* | (2006.01) |
| *H05B 33/10* | (2006.01) |
| *B82Y 20/00* | (2011.01) |

(52) U.S. Cl.
CPC ................ *H05B 33/14* (2013.01); *H05B 33/10* (2013.01); *H05B 33/22* (2013.01); *B82Y 20/00* (2013.01); *Y10S 977/762* (2013.01); *Y10S 977/95* (2013.01)

(58) Field of Classification Search
CPC .......... H01L 33/48; H01L 33/58; H01L 33/56
See application file for complete search history.

(56) References Cited

U.S. PATENT DOCUMENTS

2013/0221385 A1*  8/2013  Shibata et al. .................. 257/88

OTHER PUBLICATIONS

Trung et al., "On the origin of green emission in zinc sulfide nanowires prepared by a thermal evaporation method," Journal of Luminescence, Mar. 29, 2014, pp. 321-325.*

* cited by examiner

*Primary Examiner* — Roy Potter
*Assistant Examiner* — Paul Patton
(74) *Attorney, Agent, or Firm* — Westman, Champlin & Koehler, P.A.

(57) ABSTRACT

The invention relates to the display technical field, and discloses an electroluminescence device and a production process of the same, and a display apparatus. The electroluminescence device comprises a first electrode and a second electrode disposed oppositely, and a light-emitting layer situated between the first electrode and the second electrode, wherein the light-emitting layer comprises: nanowires of a first conducting type, which are situated on the first electrode and distributed in an array; a covering layer of a second conducting type, which covers the nanowires and is electrically connected to the second electrode. In the technical solution of the invention, since the nanowire has a diameter of only a few dozens of nanometers, which is much less than the wavelength of the emitted light, the light can pass through it and go out directly, substantially without the problem of refraction. Therefore, most of the light emitted from the light-emitting diodes can be taken out, and thereby the luminescence efficiency of the electroluminescence device is greatly improved, and thereby the luminance is improved.

20 Claims, 3 Drawing Sheets

ELECTROLUMINESCENCE DEVICE, A PRODUCTION PROCESS OF THE SAME AND A DISPLAY APPARATUS

CROSS-REFERENCE TO RELATED APPLICATION

This Application is a non-provisional Application of Chinese Application No. CN 201410081046.0, filed Mar. 6, 2014, in Chinese, the contents of which are hereby incorporated by reference in their entirety.

FIELD OF THE INVENTION

The invention relates to the field of display technology, specifically, to an electroluminescence device, a production process of the same and a display apparatus.

BACKGROUND OF THE INVENTION

Liquid crystal displays (abbr. LCD) are widely used as flat panel display equipments. Because they do not use any autoluminescence element, they need additional luminescence elements, for example, a backlight. Therefore, the thickness of a liquid crystal display is relatively large, and it is relatively hard to simplify the structure thereof. The active matrix organic light-emitting diode (abbr. OLED) is a new display technology developed in recent years. It uses an autoluminescence element, so it overcomes the above-mentioned problems in LCD, and does not need a backlight and has a relatively simple structure. However, there are relatively few organic materials applicable in OLED, and these organic materials are susceptible to moisture. Therefore, they have strict requirements on the vacuum deposition process. In order to overcome the above-mentioned restriction, some polymer materials have been used, and it has been found that other methods, for example, the ink-jet method, the laser induced thermal imaging method, or the like, can be used for producing OLED. However, methods and elements meeting the above-mentioned demands are not applied in practice. Hence, as compared with organic light-emitting diodes, inorganic semiconductor luminescence has rather a better prospect in applications.

Currently, concerning the inorganic light-emitting diodes, either for gallium nitride (GaN) emitting blue-green light or for aluminium gallium indium phosphide (AlGaInP) emitting red-yellow light, the inner light-emitting layer in the light-emitting diode element thereof has very high luminescence efficiency. However, due to the problem that materials in each of the inner layers of the light-emitting diode refract and absorb light, the actual external output efficiency of light of the light-emitting diode element is not high, and a majority of the light cannot be taken out. Therefore, the existing inorganic light-emitting diodes have relatively low luminescence efficiency and relatively low luminance.

SUMMARY OF THE INVENTION

The object of the invention is to provide an electroluminescence device, a production process of the same, and a display apparatus, for improving luminescence efficiency and, in turn, improving the luminance.

In one aspect, the invention provides an electroluminescence device, which comprises a first electrode and a second electrode disposed oppositely, and a light-emitting layer situated between the first electrode and the second electrode, wherein the light-emitting layer comprises:

nanowires of a first conducting type, which are situated on the first electrode and distributed in an array; and a covering layer of a second conducting type, which covers the nanowires and is electrically connected to the second electrode.

In a preferable technical solution of the invention, the nanowire of a first conducting type and the covering layer of a second conducting type have different conducting types. For example, the nanowire is of an N-type semiconductor, while the covering layer is of a P-type semiconductor, or, the nanowire is of a P-type semiconductor, while the covering layer is of an N-type semiconductor. Thus, this is equivalent to forming a PN junction at the interface between the nanowire and the covering layer. Hence, this is equivalent to forming a plurality of light-emitting diodes, wherein each nanowire is a light-emitting point. Since the nanowire has a diameter of only few dozens of nanometers, which is much less than the wavelength of the emitted light (350 nm to 520 nm), the light can pass through it and go out directly, substantially without the problem of refraction. Therefore, most of the light emitted from the light-emitting diodes can be taken out, and thereby the luminescence efficiency of the electroluminescence device is greatly improved, and thereby the luminance is improved. Furthermore, since the nanowire emits light in an extremely large angle range, the problem in ununiformity of the luminescence can be solved to the most extent. In addition, the electroluminescence device of the invention has a lower driving voltage and a lower cost, and is suitable for production of a light-emitting device having a large area.

As for the design of the nanowires of the light-emitting layer, preferably, the nanowires have lengths of from 1 to 5 mm, diameters of from 100 to 500 nm, and a density of from $7 \times 10^6$ to $5 \times 10^7$ nanowires/mm$^2$.

As for the design of the covering layer of the light-emitting layer, preferably, the covering layer has a thickness of from 20 to 500 nm.

When the covering layer has a relatively small thickness, it might not completely cover the nanowire, which results in that the PN junction cannot be formed at some positions, so that the luminescence efficiency is reduced. When the covering layer has a relatively large thickness, the driving voltage is increased, and the cost of the covering layer is increased.

Preferably, the materials of the nanowire and the covering layer can be independently selected from the following intrinsic semiconductor materials: calcium sulfide, zinc sulfide, yttrium oxysulfide, gadolinium oxide, magnesium pyrophosphate, calcium pyrophosphate, strontium pyrophosphate, barium pyrophosphate, calcium lanthanum sulfide, strontium yttrium sulfide, strontium sulfide, calcium sulfide, yttrium oxide, yttrium vanadium oxide, gadolinium oxysulfide, digadolinium strontium sulfide, silicon diyttrium pentoxide, disilicon diyttrium heptoxide, zinc oxide, cadmium sulfide, decaluminum magnesium barium heptadecoxide, dialuminum calcium tetrasulfide, octacalcium magnesium tetraorthosilicate dichloride, boron yttrium trioxide, barium orthosilicate, zinc dibarium pyrosilicate, dialuminum barium tetroxide, trisilicon distrontium octaoxide, strontium chloride, zinc orthosilicate, yttrium orthosilicate, decacalcium hexaphosphate dichloride, hexadecaluminum dimagnesium barium heptacosoxide or yttrium aluminum garnet.

Preferably, the electroluminescence device further comprises a buffer layer situated between the covering layer and the nanowires.

When a buffer layer is present between the nanowires and the covering layer, a PIN junction may be formed. Compared with the PN junction, the PIN junction increases the reverse breakdown voltage, decreases the turn-on voltage, and also improves the photoelectric conversion efficiency. The material of the buffer layer can be also selected from any one of the intrinsic semiconductor materials mentioned above. The thickness of the buffer layer depends on the electron mobility. The thickness is generally designed to be 10-800 nm.

Preferably, the electroluminescence device further comprises: an orientation layer situated on one side of the first electrode which faces the light-emitting layer, wherein said orientation layer is of the same material as the nanowires.

Growth of the nanowires on the orientation layer of the same material as the nanowires is beneficial for regular growth of the nanowires.

Preferably, the first electrode is a transparent conductive anode, while the second electrode is a reflective metallic cathode; or, the first electrode is a reflective metallic cathode, while the second electrode is a transparent conductive anode.

When the first electrode is a transparent conductive anode and the second electrode is a reflective metallic cathode, the light-emitting end is at the transparent conductive anode, and thus the device is a bottom emitting electroluminescence device; and when the first electrode is a reflective metallic cathode and the second electrode is a transparent conductive anode, the light-emitting end is at the transparent conductive anode, and thus the device is a top emitting electroluminescence device.

In another aspect, the invention further provides a display apparatus, which comprises any one of the above-mentioned electroluminescence devices.

In the display apparatus, thousands of nanowires are congregated to form a white light-emitting point having a size of about 0.5-3 mm, which constitutes the basic unit of the white light nanoarray display apparatus. The light-emitting points can be coated with red, green or blue fluorescent powders, respectively, so as to form a full-color display. It is also possible to form a full-color display by assembling the electroluminescence device and a color filter substrate by "matching cell".

In still another aspect, the invention provides a production process of an electroluminescence device, which comprises:
  forming a first electrode situated on a back plate;
  forming nanowires of a first conducting type, which are situated on the first electrode and distributed in an array;
  forming a covering layer of a second conducting type, which covers the nanowires; and
  forming a second electrode situated on the covering layer.

Preferably, after the covering layer of the second conducting type which covers the nanowires is formed, the process further comprises:
  subjecting the covering layer to anneal.

Preferably, after the nanowires situated on the first electrode and distributed in an array are formed, the process further comprises:
  using plasma to bombard the surfaces of the nanowires.

As for any one of the above-mentioned production processes, preferably, the formation of nanowires of a first conducting type, which are situated on the first electrode and distributed in an array, specifically comprises:
  forming an orientation layer situated on the first electrode; and
  forming nanowires of a first conducting type, which are situated on the orientation layer and distributed in an array, wherein the material of the orientation layer is the same as that of the nanowires.

SIGNS IN THE DRAWINGS

1—a back plate; 2—a first electrode; 3—a nanowire; 4—a covering layer; 5—a second electrode; 6—a packaging adhesive; 7—a cover plate; 10—an orientation layer.

DETAILED DESCRIPTION OF THE INVENTION

The invention provides an electroluminescence device and a production process of the same and a display apparatus, in order to solve the technical problem existing in prior art that the luminescence efficiency of the light-emitting diode is relatively low and thereby the luminance is relatively low. The electroluminescence device comprises a first electrode and a second electrode disposed oppositely, and a light-emitting layer situated between the first electrode and the second electrode, wherein the light-emitting layer comprises: nanowires of a first conducting type, which are situated on the first electrode and distributed in an array; and a covering layer of a second conducting type, which covers the nanowires and is electrically connected to the second electrode.

In the technical solution of the invention, a PN junction is formed at the interface between the covering layer and the nanowire. Each nanowire corresponds to a light-emitting point of a light-emitting diode. Since the diameter of the nanowire is much less than the wavelength of the emitted light, the light can pass through it and go out directly, substantially without the problem of refraction. Therefore, most of the light emitted from the light-emitting diodes can be taken out, and thus the luminescence efficiency of the electroluminescence device is greatly improved, and the luminance is improved. In order to make the purposes, technical solutions and advantages of the invention more clear, the invention is further described below in details by given examples.

Figure 1:
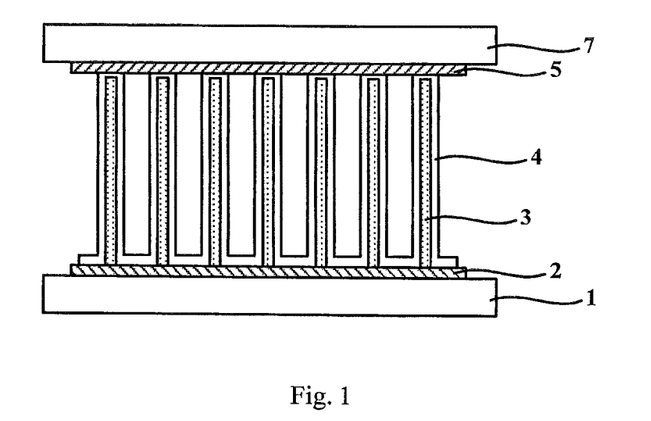
FIG. 1 is the schematic of the structure of the electroluminescence device according to one example of the invention.

In one aspect, an embodiment of the invention provides an electroluminescence device, as shown in FIG. 1. FIG. 1 is the schematic of the structure of the electroluminescence device according to one example of the invention. The electroluminescence device comprises a first electrode 2 and a second electrode 5 disposed oppositely, and a light-emitting layer situated between the first electrode 2 and the second electrode 5, wherein the light-emitting layer comprises:

nanowires 3 of a first conducting type, which are situated on the first electrode 2 and distributed in an array; and a covering layer 4 of a second conducting type, which covers the nanowires 3 and is electrically connected to the second electrode 5.

In the technical solution of the invention, the nanowire 3 of the first conducting type and the covering layer 4 of the second conducting type have different conducting types. For example, the nanowire 3 is of an N-type semiconductor, while the covering layer 4 is of a P-type semiconductor, or, the nanowire 3 is of a P-type semiconductor, while the covering layer 4 is of an N-type semiconductor. This is equivalent to forming a PN junction at the interface between the nanowire 3 and the covering layer 4. Hence, this is equivalent to forming a plurality of light-emitting diodes, wherein each nanowire 3 is a light-emitting point. Since the nanowire 3 has a diameter of only a few dozens of nanometers, which is much less than the wavelength of the emitted light (350 nm-520 nm), the light can pass through it and go out directly, substantially without the problem of refraction. Therefore, most of the light emitted from the light-emitting diodes can be taken out, and thereby the luminescence efficiency of the electroluminescence device is greatly improved, and the luminance is improved. Furthermore, the nanowire 3 has a 1-dimensional structure, so that white light emission with high efficiency and uniformity can be obtained. Since the nanowire 3 emits light in an extremely large angle range, the problem in ununiformity of the luminescence can be solved to the most extent.

Additionally, in the electroluminescence device of the invention, a coating structure, in which the covering layer coats the nanowires, is formed. On a substrate having a certain area, the surface area of a nanostructure is much larger than that of a thin film structure. Therefore, the area of the light-emitting surface formed by coating the nanostructure is also much larger than that in a conventional thin-film light-emitting device. Compared with the light-emitting area of the conventional multi-layer organic electroluminescence device, the effective light-emitting area of the electroluminescence device of the invention is greatly improved. Meanwhile, the luminescence of nanowires allows the device to have a high light extraction efficiency. It is possible to obtain luminescence having higher efficiency than conventional inorganic PN junction luminescence, and thereby to decrease the power and driving voltage of the display. Furthermore, the material used in the electroluminescence device of the invention is an inorganic material, which has a lower cost and is suitable for production of a light-emitting device having a large area.

Optionally, the electroluminescence device in FIG. 1 can further comprise a back plate 1 and a cover plate 7.

Figure 2:
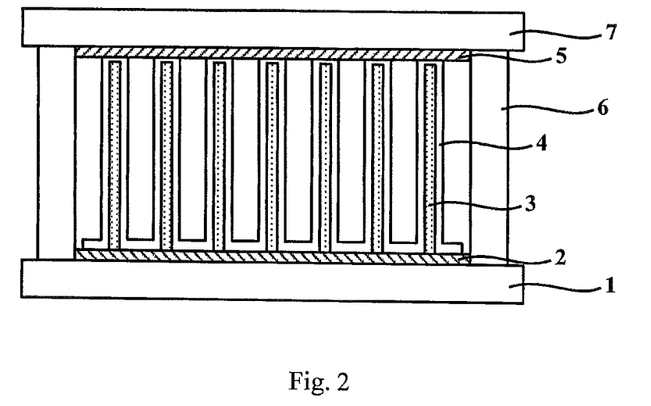
FIG. 2 is the schematic of the structure of the electroluminescence device according to another example of the invention.

As shown in FIG. 2, which is the schematic of the structure of the electroluminescence device according to another example of the invention, the electroluminescence device can further comprise a back plate 1 and a cover plate 7. Additionally, the back plate 1 and the cover plate 7 can be bonded by the packaging adhesive 6. On the back plate, a driving circuit can also be provided. The electroluminescence device emits light, when electric potential is applied to the driving circuit.

Further referring to FIG. 1, as for the design of the nanowires 3 of the light-emitting layer, preferably, the nanowires 3 have lengths of from 1 to 5 mm, diameters of from 100 to 500 nm, and a density of from $7 \times 10^6$ to $5 \times 10^7$ wires/mm$^2$.

For example, the nanowires 3 have lengths of 1 mm, diameters of from 100 to 120 nm, and a density of $8 \times 10^6$ wires/mm$^2$; or, the nanowires 3 have lengths of 1 mm, diameters of from 200 to 250 nm, and a density of $5 \times 10^6$ wires/mm$^2$. As an example, nanowires with a diameter of from 50 to 70 nm, which is formed by a VLS (Vapor Liquid Solid) growing method by using gold as the catalyst, can also be used.

Further referring to FIG. 1, as for the design of the covering layer 4 of the light-emitting layer, the thickness of the covering layer 4 is preferably from 20 to 500 nm.

For example, the thickness of the covering layer is from 20 nm to 300 nm, or from 50 nm to 500 nm, or from 100 nm to 500 nm, or from 200 nm to 500 nm, or from 50 nm to 300 nm, or from 100 nm to 300 nm, or from 200 nm to 300 nm, or from 100 nm to 200 nm, e.g. about 20 nm, 50 nm, 100 nm, 200 nm, 300 nm or 500 nm.

When the thickness of the covering layer is relatively small, it might not cover the nanowire completely, which results in that in some positions the PN junction cannot be formed, and thereby the luminescence efficiency is decreased. When the thickness of the covering layer is larger, the driving voltage is higher, and the cost of the covering layer is increased.

Further referring to FIG. 1, preferably, the materials of the nanowire 3 and the covering layer 4 can be selected from conventional semiconductor materials in the art. For example, the nanowire 3 and the covering layer 4 can independently selected from following intrinsic semiconductor materials: calcium sulfide (CaS), zinc sulfide (ZnS), yttrium oxysulfide ($Y_2O_2S$), gadolinium oxide ($Gd_2O_3$), magnesium pyrophosphate ($MgP_2O_7$), calcium pyrophosphate ($CaP_2O_7$), strontium pyrophosphate ($SrP_2O_7$), barium pyrophosphate ($BaP_2O_7$), calcium lanthanum sulfide ($CaLa_2S_4$), strontium yttrium sulfide ($SrY_2S_4$), strontium sulfide (SrS), calcium sulfide (CaS), yttrium oxide ($Y_2O_3$), yttrium vanadium oxide ($YVO_4$), gadolinium oxysulfide ($Gd_2O_2S$), digadolinium strontium sulfide ($SrGa_2S_4$), silicon diyttrium pentoxide ($Y_2SiO_5$), disilicon diyttrium heptoxide ($Y_2Si_2O_7$), zinc oxide (ZnO), cadmium sulfide (CdS), decaluminum magnesium barium heptadecoxide ($BaMgAl_{10}O_{17}$), dialuminum calcium tetrasulfide ($CaAl_2S_4$), octacalcium magnesium tetraorthosilicate dichloride ($Ca_8Mg(SiO_4)_4Cl_2$), boron yttrium trioxide ($YBO_3$), barium orthosilicate ($Ba_2SiO_4$), zinc dibarium pyrosilicate ($Ba_2ZnSi_2O_7$), dialuminum barium tetroxide ($BaAl_2O_4$), trisilicon distrontium octaoxide ($Sr_2Si_3O_8$), strontium chloride ($SrCl_2$), zinc orthosilicate ($Zn_2SiO_4$), yttrium orthosilicate ($YSiO_5$), decacalcium hexaphosphate dichloride ($Ca_{10}(PO_4)_6Cl_2$), hexadecaluminum dimagnesium barium heptacosoxide ($BaMg_2Al_{16}O_{27}$), YAG (yttrium aluminum garnet); wherein the doping agent can be H, N, Li, Na, Ce, Tm, Ag, Cl, Te, Mn, Eu, Bi, Tb, Cu, Zn or Ga.

Specifically, the semiconductor material formed from the above-mentioned intrinsic semiconductor and the doping agent can be any one of the followings:

CaS:Eu, ZnS:Sm, ZnS:Mn, $Y_2O_2S$:Eu, $Y_2O_2S$:(Eu,Bi), $Gd_2O_3$:Eu, (Sr,Ca,Ba,Mg) $P_2O_7$:(Eu,Mn), $CaLa_2S_4$:Ce, $SrY_2S_4$:Eu, (Ca,Sr)S:Eu, SrS:Eu, $Y_2O_3$:Eu, $YVO_4$:(Eu,Bi), ZnS:Tb, ZnS:(Ce,Cl), ZnS:Cu,Al, $Gd_2O_2S$:Tb, $Gd_2O_3$:(Tb,Zn), $Y_2O_3$:(Tb,Zn), $SrGa_2S_4$:Eu, $Y_2SiO_5$:Tb, $Y_2Si_2O_7$:Tb, $Y_2O_2S$:Tb, ZnO:Ag, ZnO:(Cu,Ga), CdS:Mn, $BaMgAl_{10}O_{17}$:(Eu,Mn), (Sr,Ca,Ba)(Al,Ga)$_2S_4$:Eu, $Ca_8Mg(SiO_4)_4Cl_2$:(Eu,Mn), $YBO_3$:(Ce,Tb), $Ba_2SiO_4$:Eu, (Ba,Sr)$_2SiO_4$:Eu, $Ba_2(Mg,Zn)Si_2O_7$:Eu, (Ba,Sr)$Al_2O_4$:Eu, $Sr_2Si_3O_8$, $SrCl_2$:Eu, SrS:Ce, ZnS:Tm, ZnS:(Ag,Cl), ZnS:Te, $Zn_2SiO_4$:Mn, $YSiO_5$:Ce, (Sr,Mg,Ca)$_{10}(PO_4)_6Cl_2$:Eu, $BaMgAl_{10}O_{17}$:Eu, $BaMg_2Al_{16}O_{27}$:Eu, YAG. In the molecular formula mentioned above, the material before the colon is the intrinsic semiconductor, the material after the colon is the doping agent, and the elements in the bracket means one of the alternatives.

The nanowires and the covering layer also can be of aluminum strontium calcium oxide $Ca_xSr_{x-1}Al_2O_3:Eu^{+2}$, which is produced by mixing $CaAl_2O_3$ and $SrAl_2O_3$ and doping $Eu^{+2}$. Additionally, the nanowires and the covering layer also can be of any of indium oxide ($In_2O_3$), tin dioxide ($SnO_2$), silicon germanide (SiGe), gallium nitride (GaN), indium phosphide (InP), indium arsenide (InAs), gadolinium phosphide (GaP), gadolinium arsenide (GaAs), zinc sulfide (ZnS), zinc selenide (ZnSe), cadmium sulfide (CdS), cadmium selenide (CdSe) and germanium.

Preferably, the electroluminescence device further comprises a buffer layer situated between the covering layer 4 and the nanowires 3.

There is a buffer layer (not shown) between the nanowires and the covering layer. These can form a PIN junction. Compared with a PN junction, the PIN junction increases the reverse breakdown voltage, decreases the turn-on voltage, and also improves the photoelectric conversion efficiency. The material of the buffer layer can also be selected from any one of the above-mentioned intrinsic semiconductor materials. The thickness of the buffer layer relates to the electron mobility. Generally, the thickness thereof is set to be from 10 to 800 nm.

Figure 3:
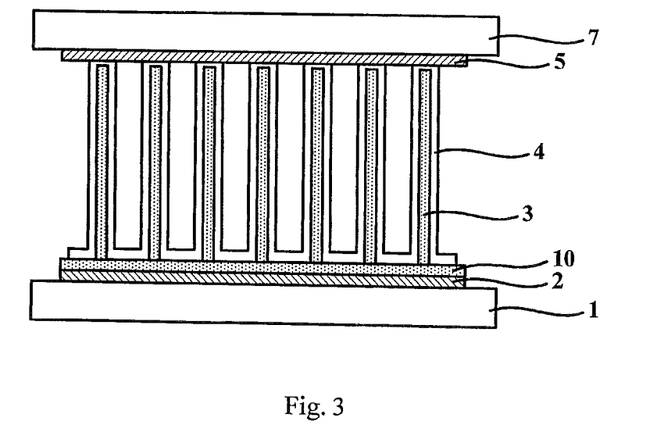
FIG. 3 is the schematic of the structure of the electroluminescence device according to another example of the invention.

As shown in FIG. 3, which is the schematic of the structure of the electroluminescence device according to another example of the invention, preferably, the electroluminescence device further comprises an orientation layer 10 situated on one side of the first electrode 2, which side faces the light-emitting layer, wherein the orientation layer 10 is of the same material as the nanowires 3.

The growth of the nanowires 3 on an orientation layer 10 having the same material as that of the nanowires 3 is beneficial for regular growth of the nanowires 3.

Further referring to FIG. 1, preferably, the first electrode 2 is a transparent conductive anode and the second electrode 5 is a reflective metallic cathode; or, the first electrode 2 is a reflective metallic cathode and the second electrode 5 is a transparent conductive anode.

When the first electrode 2 is a transparent conductive anode and the second electrode 5 is a reflective metallic cathode, the light-emitting end is at the transparent conductive anode, and thus the device is a bottom emitting electroluminescence device. When the first electrode 2 is a reflective metallic cathode and the second electrode 5 is a transparent conductive anode, the light-emitting end is at the transparent conductive anode, and thus the device is a top emitting electroluminescence device.

In any example mentioned above, the device can also comprise an insulating material for supporting (not shown) situated between the back plate 1 and the first electrode 2. The material used in the insulating material for supporting is silicon dioxide ($SiO_2$), silicon nitride ($SiN_x$), or other ceramic materials.

One embodiment of the invention further provides a display apparatus comprising any one of the electroluminescence devices mentioned above.

In the display apparatus, thousands of nanowires are congregated to form a white light-emitting point having a size of about 0.5-3 mm. The light-emitting point constitutes the basic unit of the white light nanoarray display apparatus. The light-emitting points can be coated with red, green or blue fluorescent powders, respectively, so as to form a full-color display. It is also possible to form a full-color display by assembling the electroluminescence device and a color filter substrate by "matching cell". The display apparatus can be any product or component having displaying function, such as electronic paper, TV, display, digital photo frame, mobile phone, flat PC or the like. In the display apparatus, each nanowire of the electroluminescence device corresponds to a light-emitting point of a light-emitting diode. Since the diameter of the nanowire is much less than the wavelength of the emitted light, the light can pass through it and go out directly, substantially without the problem of refraction. Therefore, most of the light emitted from the light-emitting diodes can be taken out, and thus the luminescence efficiency of the electroluminescence device is greatly improved, and the luminance is improved. Therefore, the brightness of the display apparatus is improved.

Figure 4:
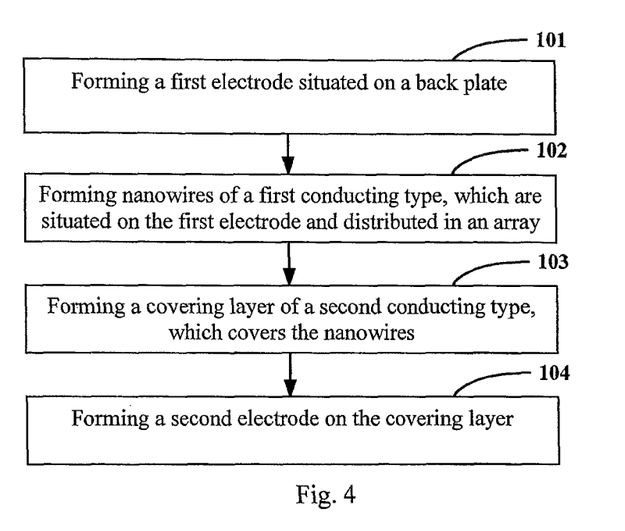
FIG. 4 is the schematic of the procedure of the production process of the electroluminescence device according to one example of the invention.

One embodiment of the invention also provides a production process of an electroluminescence device, as shown in FIG. 4, which is the schematic of the procedure of the production process of the electroluminescence device according to one example of the invention. The production process comprises:

Step 101: forming a first electrode situated on a back plate;

Step 102: forming nanowires of a first conducting type, which are situated on the first electrode and distributed in an array;

Step 103: forming a covering layer of a second conducting type, which covers the nanowires; and Step 104: forming a second electrode on the covering layer.

The nanowires can be produced by conventional method for growing nanowires, such as the V-S (Vapor Solid, Vapor-Solid) method or VLS (Vapor Liquid Solid, Vapor-Liquid-Solid) method. The nanowires also can be produced by etching later.

In order to allow the covering layer to cover the nanowires effectively, to reduce the defects in the interface and improve the matching degree of the lattices, the following two methods can be used. One manner is that the process further comprises annealing the covering layer after the covering layer that covers the nanowires is formed.

The annealing temperature can be selected from 150 to 700° C., preferably, from 150 to 500° C. For example, the lower limit of the annealing temperature can be 150° C., 200° C., 250° C., 300° C. or 350° C., and the upper limit thereof can be 400° C., 500° C., 550° C., 600° C. or 700° C. For example, the annealing temperature can be about 150° C., 200° C., 250° C., 300° C., 400° C., 500° C., 550° C., 600° C. or 700° C.

The other manner is that the process further comprises bombarding the surfaces of the nanowires with plasma after the nanowires distributed in an array on the first electrode are formed.

The source bias voltage of the plasma enhanced chemical vapor deposition equipment is controlled, and thereby the defects on the surfaces of the covering layer and the nanowires are reduced. The covering layer is uniformly coated by using plasma to bombard the surfaces of the nanowires.

As for any of the above-mentioned production processes, preferably, the formation of nanowires of a first conducting type, which are situated on the first electrode and distributed in an array, specifically includes:

forming an orientation layer situated on the first electrode; and forming nanowires of a first conducting type, which are situated on the orientation layer and distributed in an array, wherein the material of the orientation layer and the material of the nanowires are the same.

The material of the nanowires can be grown on a homogeneous substrate. For example, silicon nanowires are grown on a silicon substrate, or gallium arsenide nanowires are grown on a gallium arsenide substrate. The nanowires can also be grown on a heterogeneous substrate. For example, nanowires of zinc oxide, gallium nitride or the like are grown on an alumina substrate; a nanowire material, such as zinc oxide, gallium nitride, gallium arsenide or the like is selectively grown on a transparent conductive substrate, such as a monocrystalline substrate of silicon carbide, zinc oxide or gallium nitride, which is conductive per se and has a good transmittance. However, the above-mentioned transparent conductive monocrystalline material has a high cost and a small area. But in the present invention, the nanowires are designed to grow on a glass substrate plated with a transparent conductive film (indium tin oxide or zinc oxide), which can greatly reduce the cost of production, and can produce articles with a large area, so as to form flat displays or light-emitting units. Additionally, forming an orientation layer of the same material as the material of the nanowires on the transparent conductive layer is beneficial for the regular growth of the nanowires.

Next, the production process of the electroluminescence device of the invention will be described by listing particular examples. However, the invention is not limited to the following examples. The illustration is made by referring to FIGS. 5a to 5e in combination.

Example 1

Figure 5A:
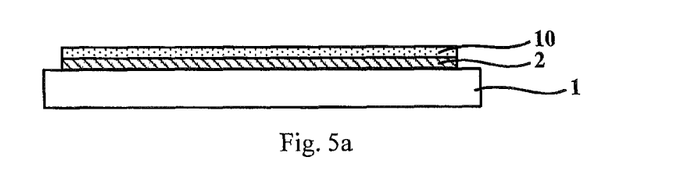
FIG. 5a is the schematic of the structure of the electroluminescence device, in which the orientation layer has been accomplished.

As shown in FIG. 5a, which is the schematic of the structure of the electroluminescence device, in which the orientation layer has been accomplished, an orientation layer 10 was produced on a back plate 1, on which a driving circuit and a first electrode 2 had been provided. The material of the orientation layer 10 was the same as the material of the nanowires. The thickness of the orientation layer 10 was about from 50 to 2000 Å. In this Example, the orientation layer 10 was a P-type thin film, and the first electrode 2 was a transparent conductive layer, for example, a transparent conductive semiconductor thin film of indium tin oxide (ITO), indium zinc oxide (IZO), indium gallium zinc oxide (IGZO) or the like. It was necessary to provide an insulating material for supporting, such as $SiO_2$, on the back plate 1 by etching in advance.

Figure 5B:
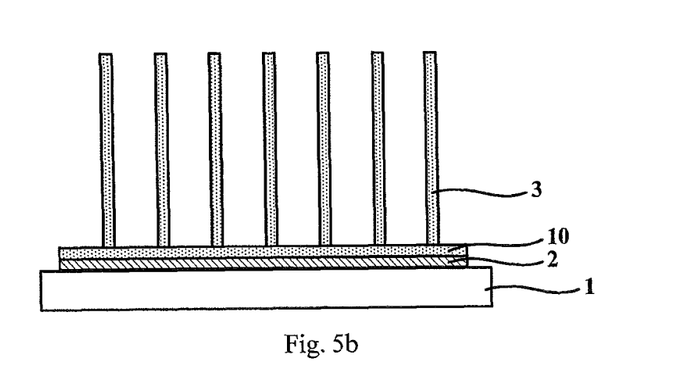
FIG. 5b is the schematic of the structure of the electroluminescence device, in which the nanowires have been accomplished.

As shown in FIG. 5b, which is the schematic of the structure of the electroluminescence device, in which the nanowires have been accomplished, the back plate, on which the orientation layer 10 had been produced, was heated in vacuo to a certain temperature range, e.g. from 150° C. to 600° C. Monocrystalline P-type nanowires 3 were grown on the orientation layer 10 by using a V-S (Vapor Solid) method, wherein the catalyst was Zn, which acted as an autocatalyst. The source vapors grew to form ZnO nanowires 3 having a single crystal orientation and uniform morphology via spontaneous nucleation during deposition. Adjusted depending on the time of growth and on the vapor sources, the length, the diameter and the growth density of the ZnO nanowires 3 could be modified. In this Example, the time of growth was 90 min. The resultant ZnO nanowires 3 were of from 100 to 200 nm in diameter, of 2 mm or less in length, and of $10^7$ nanowires/$mm^2$ in growth density.

Figure 5C:
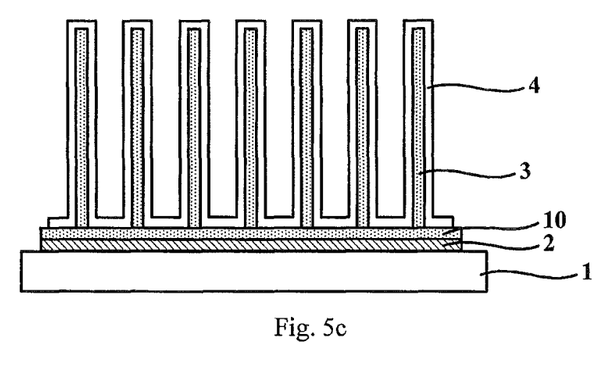
FIG. 5c is the schematic of the structure of the electroluminescence device, in which the covering layer has been accomplished.

As shown in FIG. 5c, which is the schematic of the structure of the electroluminescence device, in which the covering layer has been accomplished, on the nanowires 3, an N-type covering layer 4 was further grown by chemical vapor deposition thin film growing process, so as to form a PN junction. The covering layer 4 had a thickness of about from 20 to 500 nanometers (nm) to ensure that all of the nanowires 3 were coated completely. However, it was unnecessary to fill all of the gaps between the nanowires 3. After the covering layer 4 was accomplished, it was annealed in the temperature range of from 150° C. to 500° C. for 1 to 6 hours (h).

Figure 5D:
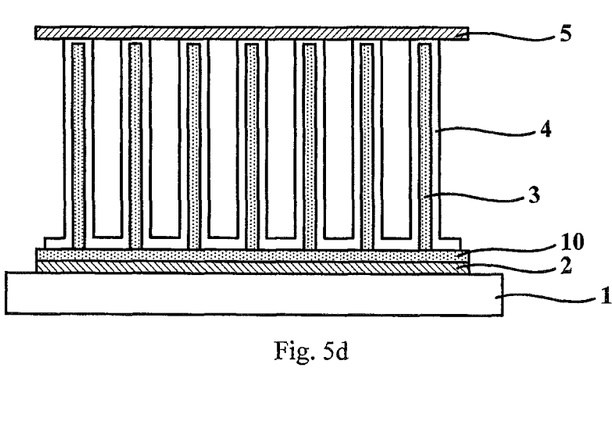
FIG. 5d is the schematic of the structure of the electroluminescence device, in which the second electrode has been accomplished.

As shown in FIG. 5d, which is the schematic of the structure of the electroluminescence device, in which the second electrode has been accomplished, the substrate was taken out after the annealing, and a second electrode 5 was produced. The second electrode acted as a metallic cathode. The metallic cathode was produced by means of sputtering or vapor deposition. The material of the metallic cathode was aluminum (Al), a molybdenum-tungsten alloy (MoW), a molybdenum-neodymium alloy (MoNd), an aluminum-neodymium alloy (AlNd), or a metal or an alloy that can be used as a cathode material.

Figure 5E:
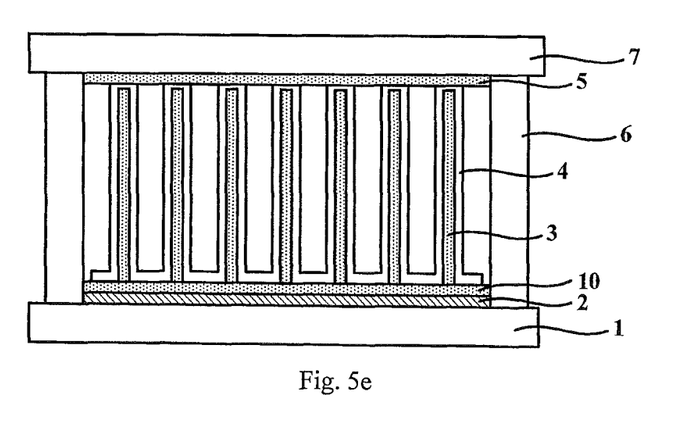
FIG. 5e is the schematic of the structure of the electroluminescence device, in which encapsulation is accomplished.

As shown in FIG. 5e, which is the schematic of the structure of the electroluminescence device, in which encapsulation has been accomplished, the device was covered with a cover plate 7 at the top. The cover plate 7 was a transparent cover plate. The electroluminescence device was encapsulated by using a packaging adhesive 6.

The electroluminescence device was a bottom-emitting electroluminescence device, which emits light from the back plate 1 after being electrified.

Example 2

As shown in FIG. 5a, an orientation layer 10 was produced on a back plate 1, on which a driving circuit and a first electrode 2 had been provided. The material of the orientation layer 10 was the same as the material of the nanowires. In this Example, the orientation layer 10 was a P-type thin film, and the first electrode 2 was a transparent conductive layer. It was necessary to provide an insulating material for supporting, such as $SiO_2$, on the back plate 1 by etching in advance. The thickness was about from 50 to 2000 Å.

As shown in FIG. 5b, the back plate, on which the orientation layer 10 had been produced, was heated in vacuo to a certain temperature range, e.g. from 150° C. to 600° C. Monocrystalline P-type nanowires 3 were grown on the orientation layer 10 by using a V-S (Vapor Solid) method, wherein the catalyst was Ga. The source vapors grew to form GaAs nanowires 3 having a single crystal orientation and uniform morphology via spontaneous nucleation during deposition. Adjusted depending on the time of growth and on the vapor sources, the length, the diameter and the growth density of the GaAs nanowires 3 could be modified. In this Example, the time of growth was 30 min. The resultant nanowires 3 were of 1 mm in length, of about 150 nm in diameter, and of $7 \times 10^6$ nanowires/$mm^2$ in density.

As shown in FIG. 5c, the surfaces of the nanowires 3 were bombarded by plasma with appropriate energy in a vacuum equipment. For example, the surfaces of the nanowires 3 were bombarded by RF plasma of Ar, which was given out with energy of 1500 W or less in power. Then an N-type covering layer 4 was further grown on the nanowires 3, to form a PN junction. The covering layer 4 had a thickness of about from 20 to 500 nm to ensure that all of the nanowires were coated completely. However, it was unnecessary to fill all of the gaps between the wires.

As shown in FIG. 5d, after the covering layer was produced, the substrate was taken out, and a second electrode 5 was produced. The second electrode acted as a metallic cathode. The metallic cathode was produced by means of sputtering or vapor deposition.

As shown in FIG. 5e, the device was covered with a cover plate 7 at the top. The cover plate 7 was a transparent cover plate. The electroluminescence device was encapsulated by using a packaging adhesive 6.

The electroluminescence device was a bottom-emitting electroluminescence device, which emits light from the back plate 1 after being electrified.

Example 3

As shown in FIG. 5a, an orientation layer 10 was produced on a back plate 1, on which a driving circuit and a first electrode 2 had been provided. The material of the orientation layer 10 was the same as the material of the nanowires. The thickness of the orientation layer 10 was about from 50 to 2000 Å. The first electrode 2 was a reflective metallic cathode, for example, of aluminum (Al), a molybdenum-tungsten alloy (MoW), a molybdenum-neodymium alloy (MoNd), an aluminum-neodymium alloy (AlNd), or a metal or an alloy that can be used as cathode material. It was necessary to provide an insulating material for supporting, such as $SiO_2$, on the back plate 1 by etching in advance.

As shown in FIG. 5b, the back plate, on which the orientation layer 10 had been produced, was heated in vacuo to a certain temperature range, e.g. from 150° C. to 600° C. Monocrystalline N-type nanowires 3 were grown on the orientation layer 10 by using a VLS method, wherein the catalyst was Au. The source vapors grew to form nanowires 3 having a single crystal orientation and uniform morphology via spontaneous nucleation during deposition. Adjusted depending on the time of growth and on the vapor sources, the length, the diameter and the growth density of the nanowires 3 could be modified. In this Example, the time of growth was 120 min. The resultant nanowires 3 were of from 2 mm to 3 mm in length, of 500 nm or less in diameter, and of $3\times10^7$ nanowires/$mm^2$ in growth density.

As shown in FIG. 5c, on the nanowires 3, a P-type covering layer 4 was further grown by a thin film growing process, such as a chemical vapor deposition process, to form a PN junction. The covering layer 4 had a thickness of about from 20 to 500 nm to ensure that all of the nanowires were coated completely. However, it was unnecessary to fill all of the gaps between the nanowires. After the growth of the covering layer 4 was accomplished, it was annealed in the temperature range of from 150° C. to 500° C. for 1 to 6 hours.

As shown in FIG. 5d, a second electrode 5 was produced. The second electrode was a transparent conductive anode. The transparent conductive anode was produced by means of sputtering or vapor deposition. The material of the transparent conductive anode could be indium tin oxide (ITO), indium zinc oxide (IZO), indium gallium zinc oxide (IGZO) or other transparent conductive semiconductor thin films.

As shown in FIG. 5e, the device was covered with a cover plate 7 at the top. The cover plate 7 was a transparent cover plate. The electroluminescence device was encapsulated by using a packaging adhesive 6.

The electroluminescence device was a top-emitting electroluminescence device, which emits light from the cover plate 7 after being electrified.

Example 4

As shown in FIG. 5a, an orientation layer 10 was produced on a back plate 1, on which a driving circuit and a first electrode 2 had been provided. The material of the orientation layer 10 was the same as the material of the nanowires. The thickness of the orientation layer 10 was about from 50 to 2000 Å. The first electrode 2 was a reflective metallic cathode. It was necessary to provide an insulating material for supporting, such as $SiO_2$, on the back plate 1 by etching in advance.

As shown in FIG. 5b, the back plate, on which the orientation layer 10 had been produced, was heated in vacuo to a certain temperature range, e.g. from 150° C. to 600° C. Monocrystalline N-type nanowires 3 were grown on the orientation layer 10 by using a V-S method, wherein the catalyst was In. The source vapors grew to form InP nanowires 3 having a single crystal orientation and uniform morphology via spontaneous nucleation during deposition. Adjusted depending on the time of growth and on the vapor sources, the length, the diameter and the growth density of the InP nanowires 3 could be modified. In this Example, the time of growth was 150 min. The resultant InP nanowires 3 were of 5 mm or less in length, of 500 nm or less in diameter, and of $5\times10^7$ nanowires/$mm^2$ in growth density.

As shown in FIG. 5c, the surfaces of the nanowires 3 were bombarded by plasma with appropriate energy in a vacuum equipment. For example, the surfaces of the nanowires 3 were bombarded by RF plasma of Ar, which was given out with energy of 1500 W or less in power. Then a P-type covering layer 4 was further grown on the nanowires 3, to form a PN junction. The covering layer 4 had a thickness of about from 20 to 500 nm to ensure that all of the nanowires were coated completely. However, it was unnecessary to fill all of the gaps between the wires.

As shown in FIG. 5d, after the covering layer was produced, the substrate was taken out, and a second electrode 5 was produced. The second electrode acted as a transparent conductive anode. The transparent conductive anode was produced by means of sputtering or vapor deposition.

As shown in FIG. 5e, the device was covered with a cover plate 7 at the top. The cover plate 7 was a transparent cover plate. The electroluminescence device was encapsulated by using a packaging adhesive 6.

The electroluminescence device was a top-emitting electroluminescence device, which emits light from the cover plate 7 after being electrified.

The electroluminescence devices of the examples 1-4 above were tested. The internal quantum efficiency was 80% or more, while the external quantum efficiency was 7% or more. Compared with the existing inorganic light-emitting diodes, the luminescence efficiencies thereof were significantly improved, and accordingly the luminances were improved. The driving voltage of the existing inorganic light-emitting diodes is typically about 9 V. The driving voltages of the electroluminescence devices of the examples 1-4 of the invention are lower than 1.2 V. It can be seen that the driving voltage of the electroluminescence device of the invention is also greatly reduced with respect to the existing light-emitting diodes. Furthermore, the electroluminescence device of the invention is made of inorganic materials, which are cheap. Therefore, the cost of the display apparatus is also significantly reduced.

Of course, those skilled in the art can obtain various changes and modifications without departing the spirit and scope of the invention. Thus, if such changes and modifications of the invention fall within the scope of the claims of the invention and equivalent technique thereof, the invention also intends to include such changes and modifications

What is claimed is:

1. An electroluminescence device, comprising a first electrode and a second electrode disposed oppositely, and a light-emitting layer situated between the first electrode and the second electrode, wherein the light-emitting layer comprises:
    nanowires of a first conducting type, which are situated on the first electrode and distributed in an array; and
    a covering layer of a second conducting type, which covers the nanowires and is electrically connected to the second electrode,
    wherein materials of the nanowires and the covering layer are independently selected from intrinsic semiconductor materials: calcium sulfide, zinc sulfide, yttrium oxysulfide, gadolinium oxide, magnesium pyrophosphate, calcium pyrophosphate, strontium pyrophosphate, barium pyrophosphate, calcium lanthanum sulfide, strontium yttrium sulfide, strontium sulfide, calcium sulfide, yttrium oxide, yttrium vanadium oxide, gadolinium oxysulfide, digadolinium strontium sulfide, silicon diyttrium pentoxide, disilicon diyttrium heptoxide, zinc oxide, cadmium sulfide, decaluminum magnesium barium heptadecoxide, dialuminum calcium tetrasulfide, octacalcium magnesium tetraorthosilicate dichloride, boron yttrium trioxide, barium orthosilicate, zinc dibarium pyrosilicate, dialuminum barium tetroxide, trisilicon distrontium octaoxide, strontium chloride, zinc orthosilicate, yttrium orthosilicate, decacalcium hexaphosphate dichloride, hexadecaluminum dimagnesium barium heptacosoxide or yttrium aluminum garnet.

2. The electroluminescence device of claim 1, wherein the nanowires have a length of 1 to 5 mm, a diameter of 100 to 500 nm, and a density of $7 \times 10^6$-$5 \times 10^7$ nanowires/mm$^2$.

3. The electroluminescence device of claim 1, wherein the covering layer has a thickness of 20 to 500 nm.

4. The electroluminescence device of claim 1, further comprising a buffer layer situated between the covering layer and the nanowires.

5. The electroluminescence device of claim 1, further comprising: an orientation layer situated on a side of the first electrode which faces the light-emitting layer, wherein the orientation layer is of a same material as the nanowires.

6. The electroluminescence device of claim 1, wherein the first electrode is a transparent conductive anode, and the second electrode is a reflective metallic cathode.

7. The electroluminescence device of claim 1, wherein the first electrode is a reflective metallic cathode, and the second electrode is a transparent conductive anode.

8. A display apparatus, comprising an electroluminescence device, which comprises a first electrode and a second electrode disposed oppositely, and a light-emitting layer situated between the first electrode and the second electrode, wherein the light-emitting layer comprises:
   nanowires of a first conducting type, which are situated on the first electrode and distributed in an array; and
   a covering layer of a second conducting type, which covers the nanowires and is electrically connected to the second electrode,
   wherein materials of the nanowires and the covering layer are independently selected from intrinsic semiconductor materials: calcium sulfide, zinc sulfide, yttrium oxysulfide, gadolinium oxide, magnesium pyrophosphate, calcium pyrophosphate, strontium pyrophosphate, barium pyrophosphate, calcium lanthanum sulfide, strontium yttrium sulfide, strontium sulfide, calcium sulfide, yttrium oxide, yttrium vanadium oxide, gadolinium oxysulfide, digadolinium strontium sulfide, silicon diyttrium pentoxide, disilicon diyttrium heptoxide, zinc oxide, cadmium sulfide, decaluminum magnesium barium heptadecoxide, dialuminum calcium tetrasulfide, octacalcium magnesium tetraorthosilicate dichloride, boron yttrium trioxide, barium orthosilicate, zinc dibarium pyrosilicate, dialuminum barium tetroxide, trisilicon distrontium octaoxide, strontium chloride, zinc orthosilicate, yttrium orthosilicate, decacalcium hexaphosphate dichloride, hexadecaluminum dimagnesium barium heptacosoxide or yttrium aluminum garnet.

9. The display apparatus of claim 8, wherein the nanowires have a length of 1 to 5 mm, a diameter of 100 to 500 nm, and a density of $7 \times 10^6$-$5 \times 10^7$ nanowires/mm$^2$.

10. The display apparatus of claim 8, wherein the covering layer has a thickness of 20 to 500 nm.

11. The display apparatus of claim 8, wherein the electroluminescence device further comprises a buffer layer situated between the covering layer and the nanowires.

12. The display apparatus of claim 8, wherein the electroluminescence device further comprises: an orientation layer situated on a side of the first electrode which faces the light-emitting layer, wherein the orientation layer is of a same material as the nanowires.

13. The display apparatus of claim 8, wherein the first electrode is a transparent conductive anode, and the second electrode is a reflective metallic cathode.

14. The display apparatus of claim 8, wherein the first electrode is a reflective metallic cathode, and the second electrode is a transparent conductive anode.

15. A production process of an electroluminescence device, comprising:
   forming a first electrode situated on a back plate;
   forming nanowires of a first conducting type, which are situated on the first electrode and distributed in an array;
   forming a covering layer of a second conducting type, which covers the nanowires; and
   forming a second electrode electrically connected to the covering layer,
   wherein materials of the nanowires and the covering layer are independently selected from intrinsic semiconductor materials: calcium sulfide, zinc sulfide, yttrium oxysulfide, gadolinium oxide, magnesium pyrophosphate, calcium pyrophosphate, strontium pyrophosphate, barium pyrophosphate, calcium lanthanum sulfide, strontium yttrium sulfide, strontium sulfide, calcium sulfide, yttrium oxide, yttrium vanadium oxide, gadolinium oxysulfide, digadolinium strontium sulfide, silicon diyttrium pentoxide, disilicon diyttrium heptoxide, zinc oxide, cadmium sulfide, decaluminum magnesium barium heptadecoxide, dialuminum calcium tetrasulfide, octacalcium magnesium tetraorthosilicate dichloride, boron yttrium trioxide, barium orthosilicate, zinc dibarium pyrosilicate, dialuminum barium tetroxide, trisilicon distrontium octaoxide, strontium chloride, zinc orthosilicate, yttrium orthosilicate, decacalcium hexaphosphate dichloride, hexadecaluminum dimagnesium barium heptacosoxide or yttrium aluminum garnet.

16. The production process of claim 15, further comprising: after the covering layer of the second conducting type which covers the nanowires is formed, subjecting the covering layer to anneal.

17. The production process of claim 15, further comprising: after the nanowires situated on the first electrode and distributed in an array are formed, using plasma to bombard surfaces of the nanowires.

18. The production process of claim 15, wherein the formation of nanowires of a first conducting type, which are situated on the first electrode and distributed in an array, comprises:
   forming an orientation layer situated on the first electrode; and
   forming nanowires of a first conducting type, which are situated on the orientation layer and distributed in an array.

19. The production process of claim 16, wherein the formation of nanowires of a first conducting type, which are situated on the first electrode and distributed in an array, comprises:
   forming an orientation layer situated on the first electrode; and
   forming nanowires of a first conducting type, which are situated on the orientation layer and distributed in an array.

20. The production process of claim 17, wherein the formation of nanowires of a first conducting type, which are situated on the first electrode and distributed in an array, comprises:

forming an orientation layer situated on the first electrode; and forming nanowires of a first conducting type, which are situated on the orientation layer and distributed in an array.

* * * * *